United States Patent [19]

Costa et al.

[11] 4,009,804

[45] Mar. 1, 1977

[54] ANTI-DROOL EXTRUSION DEVICE

[75] Inventors: Charles R. Costa, Plainville; Robert L. Smigel, Middletown, both of Conn.

[73] Assignee: Loctite Corporation, Newington, Conn.

[22] Filed: Mar. 18, 1976

[21] Appl. No.: 662,385

Related U.S. Application Data

[63] Continuation of Ser. No. 484,532, July 17, 1974, abandoned.

[52] U.S. Cl. ................................ 222/391; 74/141.5

[51] Int. Cl.[2] ........................................ G01F 11/02

[58] Field of Search .................... 222/391; 74/141.5

[56] References Cited

UNITED STATES PATENTS 1,986,166 1/1935 Schneider ...................... 222/391 X 3,894,663 7/1975 Carhart et al. ................ 222/391 X

FOREIGN PATENTS OR APPLICATIONS 156,022 9/1956 Sweden ............................ 222/391

*Primary Examiner*—Robert B. Reeves

*Assistant Examiner*—Frederick R. Handren

*Attorney, Agent, or Firm*—Jean B. Mauro

[57] ABSTRACT

An anti-drip caulking device is provided having a "floating" anti-kickback dog which engages the plunger shaft. When the forward motion of the shaft is stopped, the floating action permits recoil of the plunger and dog until a tension spring is sufficiently stretched to balance the recoil force, or until a mechanical stop is engaged. The floating feature is provided by a tension and compression spring acting in opposition.

4 Claims, 2 Drawing Figures

ANTI-DROOL EXTRUSION DEVICE

This is a continuation of application Ser. No. 484,532, filed July 17, 1974, now abandoned.

BACKGROUND OF THE INVENTION

Devices provided for the extrusion of extrudable, although typically viscous, materials (e.g., caulking guns) usually suffer from the shortcoming that when the extruding force is stopped, the material tends to continue to be expressed through the orifice or nozzle of the device. This results from expansion forces developed in the material in opposition to compression forces applied to the material to cause it to be expressed. The extent to which such expansion forces are developed depends on a number of factors such as the size and shape of the orifice, the viscosity, compressibility, and elasticity of the material, the rate and amount of compression force applied, the temperature, frictional considerations, etc.

This phenomenon of post-compression expansion may be readily observed in most extrusion devices, from industrial plastics fabricating machines to the common, hand-operated caulking gun used by the home handyman. While the waste of material resulting from this phenomenon is often within tolerable limits and is therefore ignored, it is always a nuisance and it becomes troublesome and expensive in industrial applications where the expressed extrudate may be difficult to clean up or is too expensive to waste. The problem is especially troublesome in those industrial operations involving applicator guns operated by hand. It is to these that the present invention is particularly addressed.

Hand-operated caulking guns are very well known, e.g., U.S. Pats. Nos. 1,986,166; 2,420,203; 2,530,359; 2,561,825; 2,582,156; 2,602,570; 2,602,571; 2,732,102; and 2,786,604. Such guns are characterized by the presence of a canted anti-kickback dog, pawl or plate having a fixed pivot point and permitting free forward movement of the piston or plunger shaft assemblies, but continuously engaging the shaft to prevent any reverse motion of the shaft once its forward stroke ceases. It is known that permitting some reverse motion of the shaft will permit expansion of the caulking material and thereby tend to prevent dribbling from the nozzle. U.S. Pat. No. 2,815,151 describes a rather complicated caulking gun mechanism designed to permit a certain amount of desirable reverse motion of the plunger.

SUMMARY OF THE INVENTION

The present invention functions by providing a means for instantaneously relieving the tendency of a compressed, extrudable material such as a caulking compound to expand under the influence of internally developed forces once the external compressing force is removed. This is accomplished by permitting the material to expand preferentially in the direction opposite to that from which the compressive force came, thereby eliminating or at least alleviating the tendency of the material to continue to be expressed through the extruder nozzle.

In a typical embodiment of this concept, a standard commercially available, advancing-plunger or piston type caulking gun is fitted with known plunger-advancing means but in addition is adapted essentially as follows: The plunger push rod is passed through a slightly enlarged hole in a dog which is pivotably mounted and has one end tension spring loaded to bias the dog forwardly from the vertical. In addition, the dog is mounted so as to "float" on the rod; i.e., its pivot point is longitudinally movable, rather than fixed. This may be accomplished by having the dog also engage a compression second spring which acts in opposition to the tension first spring. The combination of these springs locates the dog on the rod and permits the dog to have forward and rearward motion relative to both the rod and the body of the gun. When the rod is caused to advance and thereby compress and exude the material in the barrel of the gun, the frictional drag of the rod on the dog causes the dog to move longitudinally forward, thereby compressing the second spring. This movement also permits the first spring to retract correspondingly, thereby maintaining the forwardly canted attitude of the dog and permitting slippage of the rod through the hole. When the advancing force on the rod is stopped, the pent-up expansion forces in the material cause the rod to tend to recoil. However, because of the bias of the dog, the periphery of its hole grippingly engages the rod, which causes the dog to move longitudinally rearward and thereby re-extend the tension spring. Rearward motion of the doggripped rod will continue until the residual expansion force in the material is balanced by the tension force on the first spring. To limit the rearward motion, stops, e.g., protuberances on the tension spring mounting, may be provided to engage the mounting frame. Because the rod can instantaneously recoil, the compressed material expands preferentially by pushing the plunger backward rather than by overcoming the constrictive forces present in the orifice and dribbling out.

More specifically, the invention comprises an extrusion device comprising: (a) a rigid frame having two opposing ends and adapted to contain an extrudable material; (b) a nozzle mounted at one end of the frame through which the material is expressed; (c) a handle mounted at the other end of the frame; (d) a plunger and push rod mounted on the handle and advanceable coaxially with the frame and adapted to compress the material thereby causing the material to be exuded; (e) a plunger-advancing means adapted to receive actuating force and transmit this force to the push rod causing the push rod and plunger to advance; and (f) a pressure-relieving means to permit the push rod to automatically move backward, when the actuating force is stopped, a distance sufficient to relieve expansion force which has been developed in the material, said pressure-relieving means comprising a generally vertical dog slidably and pivotably mounted on the push rod, the dog having a pivot point which is longitudinally movable by the opposing action of a tension spring and a compression spring, balanced against each other so as to cause the dog to alternately tilt and then resume a more nearly vertical attitude, said tension spring being connected between the handle and the dog above said pivot point, and said compression spring being mounted coaxially on the push rod and bearing against the handle and the dog.

DETAILED DESCRIPTION OF THE INVENTION

Figure 2:
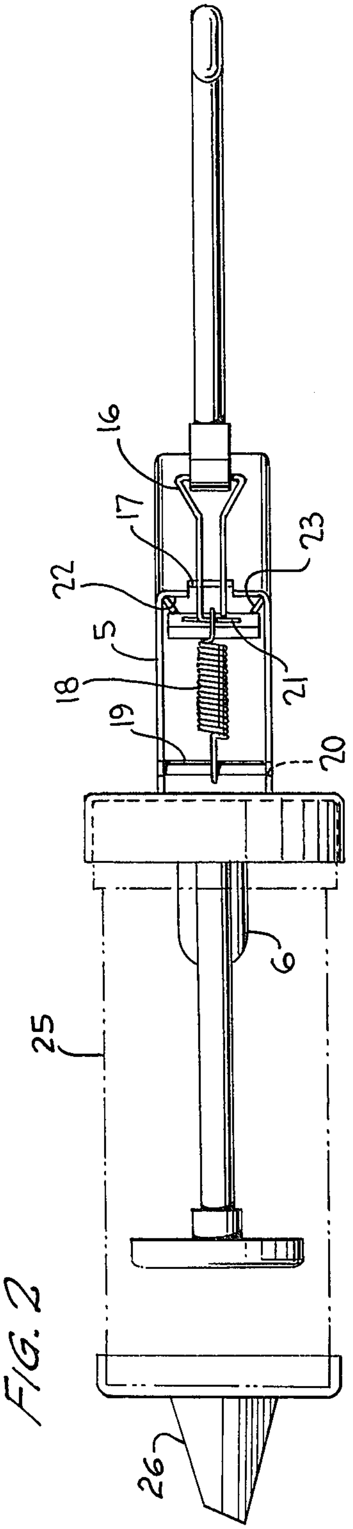
FIG. 2 is a plan view of the tension spring structure.
Figure 1:
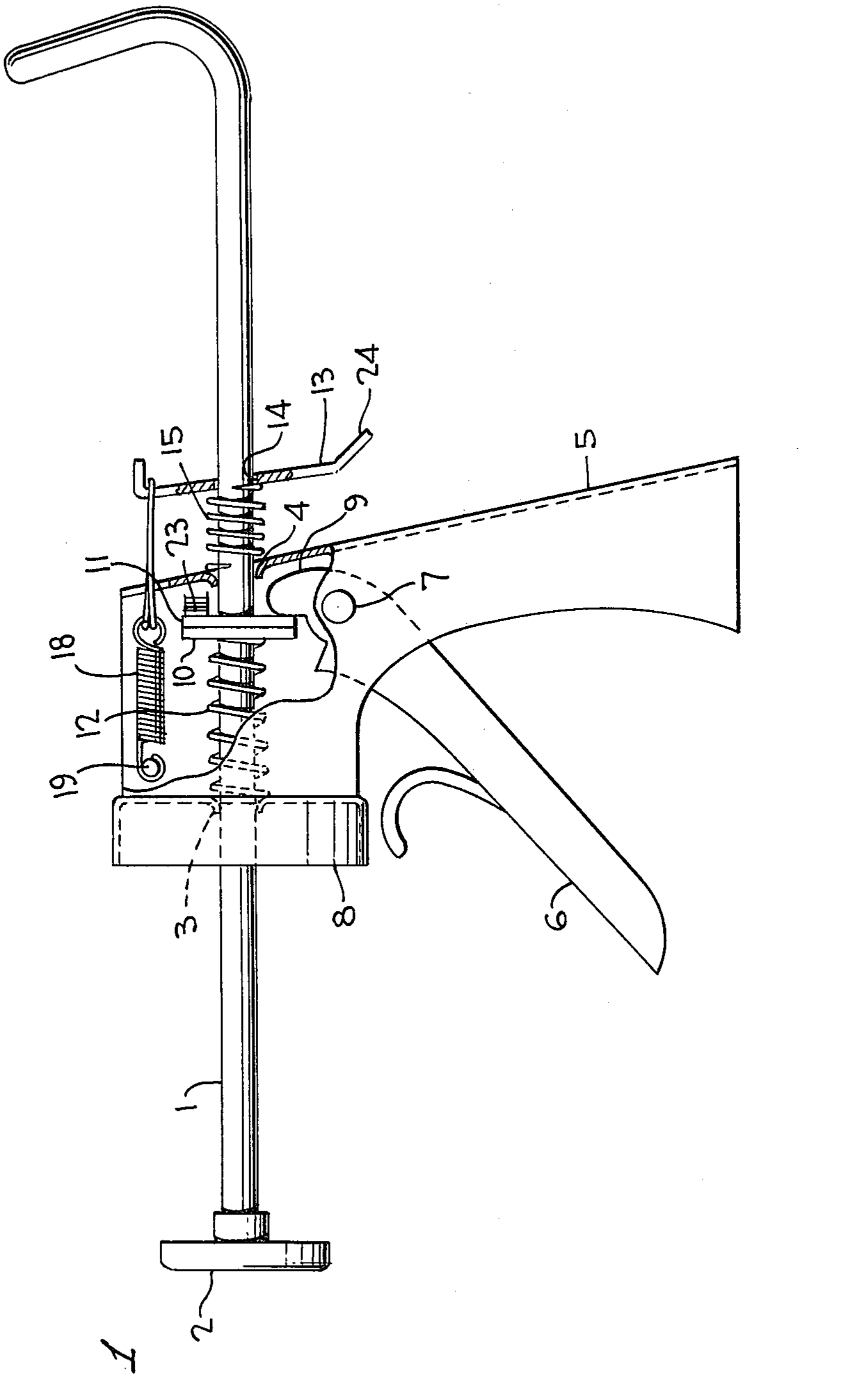
FIG. 1 is a partially cut-away assembly drawing of a preferred embodiment of this invention.

FIG. 1 shows that part of the caulking gun to which the present invention relates. Rod 1, attached at one end to plunger plate 2, is mounted slidably in bearings 3 and 4 in handle 5. In use, the left end of rod 1 would extend into a hollow tubular body 25 having a conventional nozzle 26 at one end and containing caulking compound or into a cartridge of caulking compound (not shown) and plunger plate 2 would engage a movable seal in the rear of the cartridge or, alternatively, would be designed to fit the end of the cartridge sealingly and engage the caulking compound directly. For purposes of this invention the design of plunger plate 2 is not critical. Attached to the body of handle 5 is base 8 in which the cartridge would be fixed and/or seated, depending upon the means provided by the particular gun for cartridge mounting and support.

Also mounted on handle 5, by means of pivot 7, is trigger 6. Lug 9 at the upward end of trigger 6 projects to engage clutch plates 10 and 11. These plates also bear against stamped tabs 23. Compression spring 12 bears against base 8 and presses plates 10 and 11 rearward against lug 9.

Dog 13, which is of generally rectangular shape, is slidably mounted on rod 1 which passes through slightly enlarged hole 14. Mounted coaxially on rod 1 is compression spring 15 which bears against handle 5 and dog 13. Lower end 24 of dog 13 is bent to form a thumb rest for application of finger pressure to position the dog in a generally vertical attitude. The upper portion of dog 13 is connected to tension spring 18 by being bent to engage and retain clip 16 which passes through slot 17 and is attached to tension spring 18. The other end of spring 18 is attached to pin 19 which is mounted in holes 20 in handle 5. Clip 16 may be fashioned from a single piece of stiff wire, the ends of which are bent and crisscrossed to form an attachment point for spring 18 and extend to form fingers 21. These fingers serve to limit the extension of spring 18 upon contacting surface 22.

In operation, trigger 6 is squeezed, causing lug 9 to cant plates 10 and 11 which bite into rod 1. Continued squeezing of the trigger thus causes the advancement of rod 1, the compression of spring 12, and extrusion of the caulking material, all in the known manner. The frictional drag of rod 1 on dog 13 causes it to move somewhat forward, i.e., toward handle 5, and thus to compress spring 15. As rod 1 and dog 13 move forward, spring 18 relaxes, thus maintaining dog 13 in a slightly tilted attitude and permitting rod 1 to slip through hole 14 while still bitingly engaging rod 1 in the event of rearward motion of the rod.

When rod 1 has advanced sufficiently, spring 18 relaxes sufficiently and spring 15 compresses sufficiently that dog 13 assumes a more nearly vertical attitude which tends to relieve its biting engagement with the rod. When this occurs, dog 13 slips rearward on rod 1 under the influence of spring 15 until the compression of spring 15 and the extension of spring 18 again balance each other to cause dog 13 to tilt and engage rod 1. The action described in this paragraph may be repeated several times during the course of the full travel of rod 1.

When the advancement of rod 1 is terminated by releasing trigger 6, the pent-up forces present in the compressible caulking material tend to cause the material to expand. In the prior art caulking guns a plate or dog was provided which completely prevented rearward motion of the plunger; therefore, pent-up forces in the caulking material relieved themselves by causing expansion of the material out through the nozzle in the form of "after-dribble." In the present invention, however, dog 13 is not permanently affixed at any point and thus can float forward and rearward on rod 1, as has been described. When the caulking material seeks to expand, plunger plate 2, rod 1 and bitingly-engaged dog 13 all move rearward until the tension so generated in spring 18 balances the residual expansion forces in the caulking material. Extreme rearward motion is prevented by fingers 21 engaging surface 22 of handle frame 5. The rearward motion of the plunger relieves the expansion forces in the caulking material and thus prevents or minimizes after-dribble.

The plunger may be withdrawn at will by exerting finger pressure on dog 13 in the area of finger rest 24, thus placing the dog in an essentially vertical attitude and permitting free sliding of rod 1 through hole 14.

It will be appreciated by those skilled in the art that a number of variations from the embodiment described are possible without departing from the scope and intent of the invention. For example, an appropriately designed ratchet-advancing plunger assembly is possible. The design of the tension spring mounting assembly may be varied and tension adjustability may be provided by attaching the spring to a threaded member. The important factor is that the device be so designed as to permit the dog to float on the plunger rod in the general manner described. It will also be appreciated that the specific sizing of the springs involved will depend on the overall design of the caulking gun and the physical properties of the caulking material and will best be determined by routine experimentation.

What is claimed is:

1. An extrusion device comprising: (a) a rigid frame having two opposing ends and adapted to contain an extrudable material; (b) a nozzle mounted at one end of the frame through which the material is expressed; (c) a handle mounted at the other end of the frame; (d) a plunger and push rod mounted on the handle and advanceable coaxially with the frame and adapted to compress the material thereby causing the material to be expressed; (e) a plunger-advancing means adapted to receive actuating force and transmit this force to the push rod causing the push rod and plunger to advance; and (f) a pressure-relieving means to permit the push rod to automatically move backward, when the actuating force is stopped, a distance sufficient to relieve expansion force which has been developed in the material, said pressure-relieving means comprising a generally vertical dog slidably and pivotably mounted on the push rod, the dog having a pivot point which is longitudinally movable by the opposing action of a tension spring and a compression spring, balanced against each other so as to cause the dog to alternately tilt and then resume a more nearly vertical attitude, said tension spring being connected between the handle and the dog above said pivot point, and said compression spring being mounted coaxially on the push rod and bearing against the handle and the dog.

2. The device of claim 1 wherein the backward movement of the dog is limited by the tension spring.

3. In an extrusion device comprising: (a) a rigid frame having two opposing ends and adapted to contain an extrudable material; (b) a nozzle mounted at one end of the frame through which the material is expressed; (c) a handle mounted at the other end of the frame; (d) a plunger and push rod mounted on the handle and advanceable coaxially with the frame and adapted to compress the material thereby causing the material to be expressed; (e) a plunger-advancing means adapted to receive actuating force and transmit this force to the push rod causing the push rod and plunger to advance; the improvement comprising a pressure-relieving means to permit the push rod to automatically move backward, when the actuating force is stopped, a distance sufficient to relieve expansion force which has been developed in the material, said pressure-relieving means comprising generally vertical dog slidably and pivotably mounted on the push rod, the dog having a pivot point which is longitudinally movable by the opposing action of a tension spring and a compression spring, balanced against each other so as to cause the dog to alternately tilt and then resume a more nearly vertical attitude, said tension spring being connected between the handle and the dog above said pivot point, and said compression spring being mounted coaxially on the push rod and bearing against the handle and the dog.

4. The device of claim 3 wherein the backward movement of the dog is limited by the tension spring.

* * * * *